United States Patent Office 3,711,459

Patented Jan. 16, 1973

3,711,459

AZO DYESTUFFS CONTAINING A SPIRO-PIPERAZINO CYCLIC RING

Gert Hegar, Schoenenbuch, Switzerland, assignor to Ciba-Geigy A.G., Basel, Switzerland No Drawing. Filed Mar. 9, 1970, Ser. No. 17,857
Claims priority, application Switzerland, Mar. 20, 1969, 4,246/69
Int. Cl. C09b 29/36; D06p 3/70
U.S. Cl. 260—146 D 10 Claims

ABSTRACT OF THE DISCLOSURE

Basic azo dyestuffs of the formula

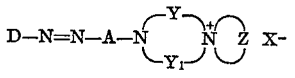

in which D represents the residue of a diazo component that may contain azo groups, A represents a benzene residue bound to the azo group in para-position to the cyclic amino group, Y and $Y_1$ each represents an alkylene group having 3, or preferably 2 carbon atoms and that may be branched, Z represents a chain of atoms forming a 5-, 6- or 7-membered ring with the nitrogen atom and that may contain hetero atoms in addition to carbon atoms, and/or contain a fused carbocyclic ring, and X represents an anion. Valuable dyestuffs especially for coloring polyacrylonitrile fibres various shades having good fastnesses to washing, perspiration and sublimation.

This invention provides new and valuable azo dyestuffs of the general formula (1)

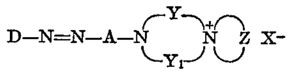

that are free from acidic groups imparting solubility in water, especially sulphonic acid groups and carboxyl groups, and in which D represents the residue of a diazo component that may contain azo groups, A represents a benzene residue bound to the azo group in para-position to the cyclic amino group, Y and $Y_1$ each represents an alkylene group having 3, or preferably 2 carbon atoms and that may be branched, Z represents a chain of atoms forming a 5-, 6- or 7-membered ring with the nitrogen atom and that may contain hetero atoms in addition to carbon atoms, and/or contain a fused carbocyclic ring, and X represents an anion. Z may be further defined as an alkylene which forms a ring with the nitrogen, said ring containing up to 6 carbon atoms, up to 5 carbon atoms interrupted by no more than two hetero atoms selected from the group consisting of nitrogen, oxygen and sulfur, or said ring contains a fused carbocyclic ring containing up to 4 carbon atoms.

The invention provides, in particular, azo dyestuffs of the formula (2)

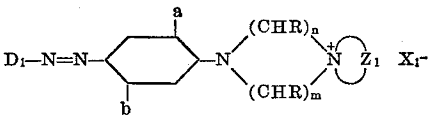

in which $D_1$ represents the residue of an aromatic or heterocyclic diazo component that may contain azo groups, *a* represents a hydrogen atom, a phenoxy group or an alkyl or alkoxy group containing not more than 4 carbon atoms, *b* represents a hydrogen or a halogen atom or a halogeno-alkyl, alkoxy, alkyl or aralkyl group containing not more than 4 aliphatically bound carbon atoms or an acylamino group whose acyl residue is derived from a heterocyclic acid, but preferably from an aromatic carboxylic acid or especially from an aliphatic carboxylic acid containing not more than 4 carbon atoms, R represents a hydrogen atom or a methyl or ethyl group, *m* and *n* each stands for 3 or 2, $Z_1$ together with the nitrogen atom forms a 5-, 6- or 7-membered ring in which the ring members may consist of not more than two further hetero atoms (oxygen, nitrogen or sulphur) in addition to the nitrogen atom and at least two carbon atoms, and $X_1$ represents an anion derived from a strong inorganic acid, a sulphuric acid semi-ester, a carboxylic acid or a sulphonic acid.

Dyestuffs that are of special interest are those of the formula (3)

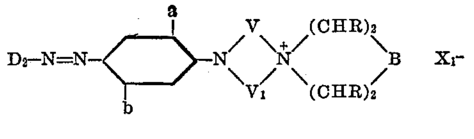

in which $D_2$ represents the residue of an aromatic diazo component of the benzene series or of a heterocyclic diazo component of the thiazole, benzthiazole, triazole or thiadiazole series that is not more than bicyclic, V and $V_1$ each represents an ethylene, propylene or isopropylene bridge and B represents a bridge of the formula —CHR—, —NR—, —O— or —S—, and in which *a*, *b*, $X_1^-$ and R have the meanings given in Formula 2. More particularly, $D_2$ is unsubstituted benzene or naphthalene or benzene or naphthalene substituted by chloro, bromo, nitro, cyano, trifluoromethyl, phenyl, phenylazo, 2-, 3- or 4-chlorophenylazo, 2,4-dichlorophenylazo, 2- or 3-nitrophenylazo, 4-methoxyphenylazo, sulphonamide or low-molecular N-alkylated sulphonamide, lower alkyl, lower alkoxy, lower alkylsulphonyl, lower carbalkoxy, carboxy-β-methoxyethylester, α-N-chlorotrimethylaminoacetyl, β-N-chlorotrimethylaminoethoxy, β-N-chloro-pyridylethoxy or acyl, the term "lower" denoting not more than 4 carbon atoms and the term "acyl" denotes acyl carboxylic acid containing not more than 7 carbon atoms and pyridyl, thiazolyl, nitrothiazolyl, methylsulphonylthiazolyl, cyanothiazolyl, methyl-nitrothiazolyl, methylthiazolyl, phenylthiazolyl, (4′-chloro)-phenylthiazolyl, (4′-nitro)-phenylthiazolyl, quinolinyl, pyrazolyl, phenylpyrazolyl, indazolyl, 1,2,4-triazolyl, (4′-methoxyphenyl)-pyrazolyl, benzthiazolyl, methylbenzthiazolyl, methoxybenzthiazolyl, ethoxybenzthiazolyl, chlorobenzthiazolyl, cyanobenzthiazolyl, nitrobenzthiazolyl, carboethoxythiazolyl, nitrobenzthiazolyl, carboethoxybenzthiazolyl, methylsulphonylbenzthiazolyl, 1,3,4-thiadiazolyl, 1,3,5-thiadiazolyl, phenyl-(p-chlorophenyl)-, (p-nitrophenyl)-pyridyl- or methyl-1,3,4-thiadiazolyl and (p-methylphenyl), (p-nitrophenyl) or phenyl-1,3,4-thiadiazolyl; V and $V_1$ each represents ethylene, propylene or isopropylene; B represents —CHR—, —NR—, —O—, —S—, a direct bond, $—SO_2—$ or $—CH_2CH_2—$; R represents hydrogen, methyl or ethyl or one of said R forms a fused carbocyclic ring of 4 carbon atoms; *a* represents hydrogen, phenoxy, alkyl or alkoxy each containing not more than 4 carbon atoms, *b* represents hydrogen or chloro, trifluoromethyl, alkoxy, alkyl each containing up to 4 carbon atoms, phenyl or aliphatic carboxylic acylamino containing up to 4 carbon atoms; and $X^-$ represents an anion.

In accordance with the invention, the new dyestuffs may be prepared by amidation or condensation or by coupling.

Manufacture by amidation or condensation may be carried out by reacting azo compounds of the formula (1a)

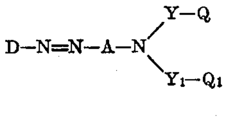

(2a)

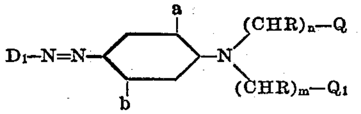

or (3a)

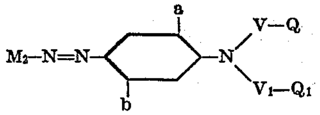

in which D, $D_1$, $D_2$, A, *a*, *b*, Y, $Y_1$, V, $V_1$, R, *n* and *m* have the meanings given above and Q and $Q_1$ each represents a reactive atom or a reactive group, for example, a halogen atom or an ester grouping that is preferably derived from a strong inorganic oxy-acid or from an aliphatic or aromatic sulphonic acid, for example, a sulphato group or an aryl- or alkyl-sulphonyloxy group, with amines of the formula (4)  (5)  or 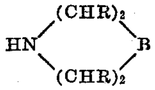

in which Z, $Z_1$, B and R have the meanings given above. Provided the anion $X^-$ of the dyestuff obtained is not subsequently replaced by another anion, it corresponds to one of the residues Q or $Q_1$.

Manufacture by coupling may be carried out by coupling diazo compounds of amines of the formulae $D—NH_2$, $D_1—NH_2$ or $D_2—NH_2$ with coupling components of the formula (7)

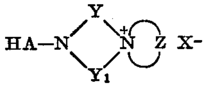

(8)

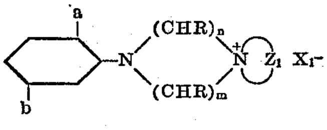

or (9)

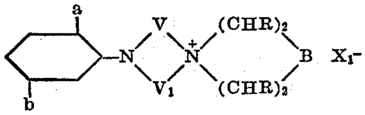

The azo dyestuffs used in the manufacture by amidation or condensation may be advantageously prepared by coupling diazotized amines, preferably of the aromatic or heterocyclic series, with the coupling components defined above. A list of suitable diazo components is included below in the section dealing with manufacture by coupling. The compounds listed can also be used as coupling components, but instead of the cyclic amino residue bound terminally to the two alkylene bridges they must contain a replaceable atom or group, for example, chlorine atoms or sulphato groups. Examples of such compounds are as follows:

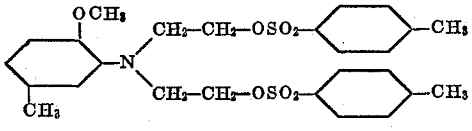

or

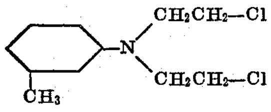

The dyestuffs obtained from these components by coupling can be reacted in accordance with the invention with cyclic secondary amines. The following are given as examples of such compounds:

5-membered ring compounds.—Pyrrolidine, 2-methyl-, 2-ethyl-, 3-methyl-, 3,4-dimethyl- or 3,3-dimethylpyrrolidine.

6-membered ring compounds.—Piperidine, 2-, 3- or 4-methyl-, 2,3-, 2,4-, 2,5- or 2,6-dimethyl-, 2,3,6- or 2,4,6-trimethyl- or 2-methyl-5-ethylpiperidine, tetrahydroisoquinoline, decahydroquinoline or decahydroisoquinoline; morpholine, 2- or 3-methyl- or ethyl-, 2,6-, 3,5- or 3,3-dimethylmorpholine; thiomorpholine or thiomorpholine-1-dioxide; piperazine, 1-, 2- or 3-methyl-, 2,5-dimethyl- or 2-, 3-, 5-, 6-tetramethylpiperazine.

7-membered ring compounds.—Hexamethyleneimine or the methyl-substitution products thereof.

The reaction between the dyestuff containing, for example, halogeno- or sulphato-alkyl groups and the cyclic amine may be carried out in a neutral solvent, for example, chlorobenzene, an alcohol or an aqueous alcohol mixture or dimethylformamide, or without a solvent, advantageously at an elevated temperature in an excess of the cyclic amine and, if desired or required, in the presence of a catalyst, for example sodium iodide.

In the coupling process of the invention, a diazotized amine may be coupled with a coupling component that already contains the quaternated cyclic amine residue.

As examples of diazo components there may be mentioned, in particular, aromatic compounds, for example compounds of the naphthalene and especially the benzene series that contain as substituents particularly halogen atoms or nitro, cyano, sulphonamide, phenyl, phenoxy or phenylazo groups or low-molecular alkyl, halogenoalkyl, alkoxy, alkylsulphonyl, N-alkylated, aralkylated or arylated sulphonamide groups, carboxylic acid alkyl ester groups or acyl groups, the term "low-molecular" denoting not more than 4 aliphatically bound carbon atoms, and the term "acyl" preferably referring to the radical of a carboxylic acid containing not more than 7 carbon atoms. These correspond, for example, to the formula

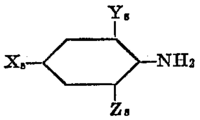

in which $X_8$ represents a hydrogen or a halogen atom or a cyano, carbalkoxy, alkanesulphonyl, sulphonamide, phenylazo or nitro group, $Y_8$ represents a hydrogen or a halogen atom or a nitro, alkyl, alkoxy, trifluoromethyl, carbalkoxy or cyano group and $Z_8$ represents a hydrogen or a halogen atom or an alkylcarbonyl or benzoyl group, and in which at least one of the symbols $X_8$ and $Y_8$ represents a halogen atom or a nitro, carbalkoxy, cyano, alkylsulphonyl, sulphonamide or phenylazo group.

The following are given as examples of suitable diazo components of the benzene series:

aniline,
1-amino-3- or -4-chlorobenzene,
1-amino-4-bromobenzene,
1-amino-2-, -3- or -4-methylbenzene,
1-amino-2-, -3- or -4-nitrobenzene,
1-amino-4-cyanobenzene,
1-aminobenzene-3- or -4-methylsulphone,
1-amino-2-chlorobenzene-4-methylsulphone,
1-amino-2,5-dicyanobenzene,
1-amino-4-carbethoxybenzene,
1-amino-2,4- or -2,5-dichlorobenzene,
1-amino-2,4-dibromobenzene,
1-amino-2-methyl-4- or -6-chlorobenzene,
1-amino-2-trifluoromethyl-4-chlorobenzene,
1-amino-2-cyano-4-chlorobenzene,
1-amino-2-cyano-4-nitrobenzene,
1-amino-2-carbomethoxy-4-chlorobenzene,
1-amino-2-methanesulphonyl-4-chlorobenzene,
1-amino-2-carbomethoxy-4-nitrobenzene,
1-amino-2-phenoxy-4-nitrobenzene,
1-amino-2-chloro-4-cyanobenzene, 1-amino-2-chloro-4-nitrobenzene,
1-amino-2-methoxy-4-nitrobenzene,
1-amino-2-chloro-4-carbethoxybenzene,
1-amino-2,4-dinitrobenzene,
1-amino-2,4-dicyanobenzene,
1-amino-2,6-dichloro-4-cyanobenzene,
1-amino-2,6-dichloro-4-nitrobenzene,
1-amino-2,5- or -2,6-dichlorobenzene-4-sulphonic acid dimethylamide,
1-amino-2-chlorobenzene-4-sulphonic acid dimethylamide,
1-amino-2,6-dibromobenzene-4-sulphonic acid amide,
1-amino-2,4-dinitro-6-chloro- or -6-bromobenzene,
1-amino-2,4-dicyano-6-chlorobenzene,
1-amino-2,4,6-trichloro- or -tribromobenzene,
1-aminobenzene-3- or -4-sulphonic acid amide,
1-aminobenzene-3- or -4-sulphonic acid-N-methyl- or N-diethylamide,
1-amino-2-benzoyl-4,6-dinitrobenzene,
4-aminoazobenzene,
4-amino-2′-chloroazobenzene,
4-amino-2′,4′-dichloroazobenzene,
4-amino-3′-chloroazobenzene,
4-amino-2′-nitroazobenzene,
1-amino-4-nitrobenzene-2-methylsulphone,
1-aminobenzene-4-carboxylic acid -β-methoxyethyl-ester
4-amino-3-nitroazobenzene,
4-amino-3′-nitroazobenzene,
4-amino-2-methylazobenzene,
4-amino-4′-methoxyazobenzene,
4-amino-3-nitro-2′-chloroazobenzene,
4-amino-3-nitro-4′-chloroazobenzene,
4-amino-3-nitro-2′,4′-dichloroazobenzene,
4-amino-3-nitro-4′-methoxyazobenzene,
4-aminodiphenyl and 2- or 4-aminodiphenylether.

However, any diazotizable heterocyclic amine that is free from acidic substituents imparting solubility in water can be used as diazo component; special mention may be made of those amines that contain a 5-membered heterocyclic ring having 2 or 3 hetero atoms, especially a nitrogen atom and one or two sulphur, oxygen or nitrogen atoms.

The heterocyclic diazo components that may be used can also contain the substituents mentioned in respect of the aromatic diazo components. They can be derivatives, for example of the pyridine, pyrazole, imidazole, triazole, tetrazole, oxazole, thiazole, selenazole, oxdiazole, thiadiazole, pyrimidine, triazine, quinoline, indazole, benzimidazole, naphthimidazole, benzoxazole, naphthoxazole, benzthiazole, naphthothiazole or benzoselenazole series. The following are given as examples:

2-aminothiazole,
2-amino-5-nitrothiazole,
2-amino-5-methylsulphonylthiazole,
2-amino-5-cyanothiazole,
2-amino-4-methyl-5-nitrothiazole,
2-amino-4-methylthiazole,
2-amino-4-phenylthiazole,
2-amino-4-(4′-chloro)-phenylthiazole,
2-amino-4-(4′-nitro)-phenylthiazole,
3-aminopyridine,
3-aminoquinoline,
3-aminopyrazole,
3-amino-1-phenylpyrazole,
3-aminoindazole,
3-amino-1,2,4-triazole,
3-amino-1-(4′-methoxyphenyl)-pyrazole,
2-aminobenzthiazole,
2-amino-6-methylbenzthiazole,
2-amino-6-methoxybenzthiazole,
2-amino-6-chlorobenzthiazole,
2-amino-6-cyanobenzthiazole,
2-amino-6-nitrobenzthiazole, 2-amino-6-carboethoxybenzthiazole,
2-amino-6-methylsulphonylbenzthiazole,
2-amino-1,3,4-thiadiazole,
2-amino-1,3,5-thiadiazole,
2-amino-4-phenyl- or -4-methyl-1,3,5-thiadiazole, and
2-amino-5-phenyl-1,3,4-thiadiazole.

Preference is given to heterocyclic diazo components belonging to the thiazole, thiadiazole, triazole and benzthiazole series.

Examples of coupling components of Formulae 7, 8 and 9 are given below in Procedures I and II.

The single diazo component may also be replaced by a mixture of two or more of the diazo components used in accordance with the invention, and the single coupling component may be replaced by a mixture of two or more of the coupling components used in accordance with the invention.

Diazotization of the above mentioned diazo components may be carried out by known methods, for example with a mineral acid, especially hydrochloric acid, and sodium nitrite, or for example, with a solution of nitrosylsulphuric acid in concentrated sulphuric acid.

Coupling may also be carried out in known manner, for example in a neutral to acid medium, if necessary, in the present of sodium acetate or a similar buffer which influences the rate of coupling, or a catalyst, for example pyridine or a salt thereof.

The new dyestuffs that contain a quaternatable nitrogen atom, especially a nitrogen atom that is a ring member in a heterocyclic diazo component, can subsequently be quaternated in accordance with the invention by a treatment with alkylating agents. Examples of suitable alkylating or quaternating agents are as follows: esters of strong mineral acids or organic sulphonic acids, for example dimethyl sulphate, diethyl sulphate; alkyl halides, for example methyl chloride, methyl bromide or methyl iodide; aralkyl halides, for example benzyl chloride; esters of low-molecular-weight alkane-sulphonic acids, for example methyl esters of methane-, ethane- or butane-sulphonic acid, and esters of benzene sulphonic acids that may contain additional substituents, for example methyl-, ethyl-, propyl- or butyl-esters of benzene sulphonic acid, 2- or 4-methylbenzene sulphonic acid, 4-chlorobenzene sulphonic acid or 3- or 4-nitrobenzene sulphonic acid; acrylic acid derivatives, for example acrylic acid amide; oxonium salts, for example triethyloxonium borofluorate.

It is expedient to effect alkylation by heating in an inert organic solvent, for example a hydrocarbon, for example benzene, toluene or xylene, a halogenated hydrocarbon, for example carbon tetrachloride, tetrachloroethane, chlorobenzene or ortho-dichlorobenzene, or a nitrohydrocarbon, for example nitromethane, nitrobenzene or a nitronaphthalene. Anhydrides, acid amides or nitriles may also be used as solvents in the alkylation process, for example acetic anhydride, dimethylformamide or acetonitrile; dimethylsulphoxide may also be used as solvent. Use may also be made of a large excess of alkylating agent instead of a solvent. In this case, care must be taken to ensure that the mixture does not become unduly heated, because the reaction is highly exothermic. However, in most cases it is generally necessary to apply external heat to the reaction mixture to initiate the reaction, particularly when using an organic solvent. In special cases, alkylation may also be carried out in an aqueous medium or with the use of an alcohol, if necessary, in the presence of a small amount of potassium iodide. Dyestuffs that are specially suitable for manufacture by the quaternation method are those in which the quaternatable nitrogen atom which is a ring member of the diazo component is bound by way of an uninterrupted chain of conjugated double bonds to the amino group in para-position to the azo bridge in the coupling component residue, and is preferably vicinal to the carbon ring-member bearing the azo bridge.

Dyestuffs of the kind specified, that is to say, those in which the ring nitrogen atom is vicinal to the ring carbon atom bearing the azo bridge, can also be obtained by oxidative coupling, that is to say, by reacting the corresponding hydrazone or a derivative thereof with the coupling component in the presence of an oxidizing agent in accordance with the following scheme:

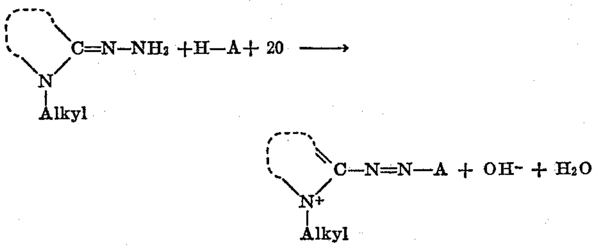

or

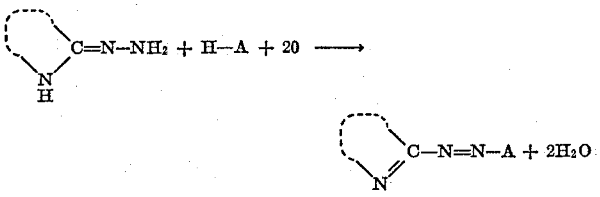

the symbol A in the above formulae representing the residue of the coupling component.

The dyestuff salts may be purified, if necessary, by dissolving them in water, and removing any unreacted starting dyestuff by filtration as an insoluble residue. The dyestuff may be precipitated from the aqueous solution by the addition of a water-soluble salt, for example sodium chloride.

The quaternated dyestuffs obtained in accordance with the process of the invention preferably contain as anion the residue of a strong inorganic acid, for example hydrochloric acid, sulphuric acid or phosphoric acid, or the residue of a sulphuric acid semi-ester, the residue of a sulphonic acid or the residue of a carboxylic acid. The said anions, which are introduced into the dyestuff molecule in accordance with the invention, may also be replaced by anions of other inorganic acids, for example phosphoric or sulphuric acid, or by anions of organic acids, for example formic acid, lactic acid or tartaric acid; in some cases the free bases may also be used. The dyestuff salts may also be used in the form of double salts, for example with halides of elements of Group II of the Periodic Table, especially zinc chloride or cadmium chloride.

The dyestuffs obtained in accordance with the invention are suitable for dyeing and printing a very wide variety of synthetic fibres, for example polyvinyl chloride, polyamide and polyurethane fibres, and also fibres made from polyesters of aromatic dicarboxylic acids, for example polyethylene terephthalate fibres, but especially polyacrylonitrile fibres or polyvinylidene cyanide fibres (Darvan), and also anionically modified synthetic polyamide and polyester fibres. By "polyacrylonitrile fibres" is meant principally polymers containing more than 80% of acrylonitrile, for example 80 to 95%; they may also contain 5 to 20% of vinyl acetate, vinyl pyridine, vinyl chloride, vinylidene chloride, acrylic acid, acrylic acid esters, methacrylic acid, methacrylic acid esters, and so forth. These products are sold under the following trade names: "Acrilan 1656" (Chemstrand Corporation, Decatur, Ala., U.S.A.). "Acrilan 41" (Chemstrand Corporation), "Creslan" (American Cyanamid Company), "Orlon 44" (Dupont), "Crylor HH" (Soc. Rhodiacéta SA, France), "Leacril N" (Appliczioni Chemice Società per Azioni, Italy), "Dynel" (Union Carbide Chem. Corp.), "Exlan" (Japanese Exlan Industry Co., Japan), "Vonnel (Mitsubishi, Japan), "Verel" (Tennessee Eastman, U.S.A.), "Zefran" (Dow Chemicals, U.S.A.), "Wolcrylon" (Filmfabrik Agfa, Wolfen), "Ssaniw" (U.S.S.R.), and also "Orlon 42," "Dralon," "Courtelle."

The new dyestuffs produce on these fibres, which may also be dyed in admixture with one another, intense and level dyeings possessing good fastness to light and good properties of general fastness, especially good fastness to washing, perspiration, sublimation, crease-resist finishing, decatizing, hot-pressing, rubbing, carbonizing, water, chlorinated water, sea water, dry cleaning, cross-dyeing and solvents. The new dyestuffs of the invention also have good stability in a wide pH range, good affinity in aqueous solutions of different pH values, good building-up properties and good fastness to kier-boiling. Furthermore, the new dyestuffs reserve well on wool and other natural polyamide fibres, and on cotton.

The quaternated, water-soluble dyestuffs generally have a low sensitivity to electrolytes, and some of them display exceptionally good solubility in water or polar solvents. Dyeing with the quaternated, water-soluble dyestuffs is generally carried out in an aqueous neutral or acid medium at the boil under atmospheric pressure or in a closed vessel at an elevated temperature and under superatmospheric pressure. The ordinary commercial levelling agents have no deleterious effect, but they are not necessary.

The said dyestuffs are also highly suitable for three-colour dyeing. Furthermore, by virtue of their stability to hydrolysis, they may be used with advantage in high-temperature dyeing and for dyeing in the presence of wool. They may also be applied to the fibrous materials by printing processes. In this method of application, a printing paste is used which contains, for example, the usual printing adjuvants in addition to the dyestuff. The dyestuffs are also suitable for the bulk-colouration of acrylonitrile polymerization products and other synthetic materials, if desired, in solution, the colourations produced being fast to light and washing. They are also suitable for colouring oil paints and lacquers, and for dyeing cotton, especially mordanted cotton, cellulose, regenerated cellulose and paper. By virtue of their good levelling properties, they are also highly suitable for use in carpet dyeing.

The following examples illustrate the invention, the parts and percentages being by weight, unless otherwise stated.

PROCEDURE I 42 parts of para-toluene-sulphochloride are added at 10 to 15° C. to 45 parts of 1-methoxy-2-N,N-[bis-2'-hydroxyethyl]-amino-4-methylbenzene in 100 parts of pyridine. The batch is stirred for 4 hours at the temperature specified, the reaction mixture is discharged onto 1,000 parts of ice, the batch is filtered, the filter residue is washed with cold water until free from pyridine, and then dried. The bis-toluene-sulphoester so obtained is stirred for 3 hours at 120° C. with 200 parts by volume of chlorobenzene and 44 parts by volume of morpholine. The coupling component of the formula

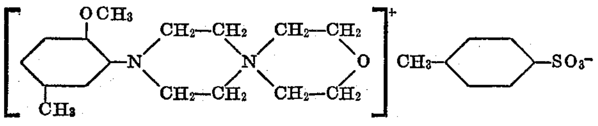

that crystallizes out when the batch cools is isolated by filtration and washed with 600 parts by volume of ethyl acetate.

PROCEDURE II 13.3 parts of N,N-bis-(2-chloroethyl)-1,3-toluidine, 17 parts of piperidine and 25 parts of dimethylformamide are refluxed for 4 hours. The batch is allowed to cool to 120° C., diluted with 75 parts of anhydrous chlorobenzene, the crystal slurry is isolated by vacuum filtration at 20° C. and washed successively with 100 parts of chlorobenzene and 100 parts of ethyl acetate. 15.9 parts of the coupling component of the formula

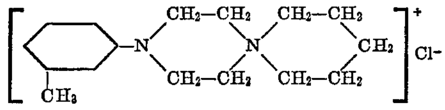

are obtained.

Further components that can be obtained in accordance with Procedures I and II are given in the following table:

(1)

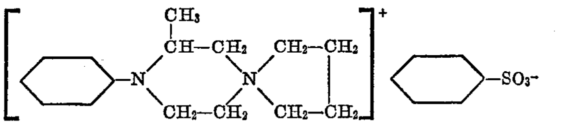

(2)

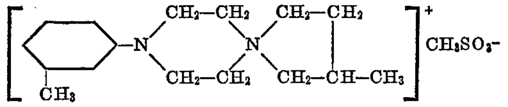

(3)

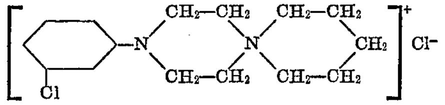

(4)

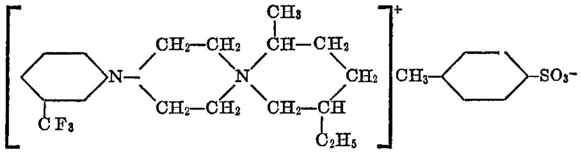

(5)

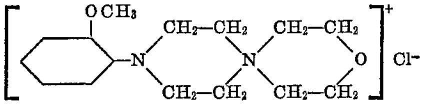

(6)

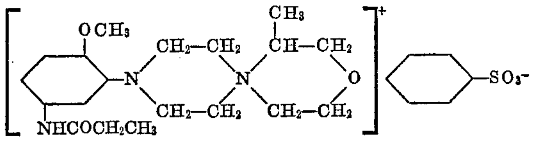

(7)

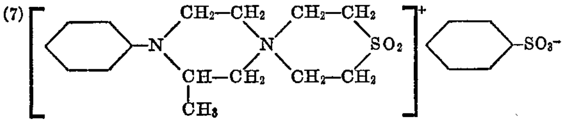

(8)

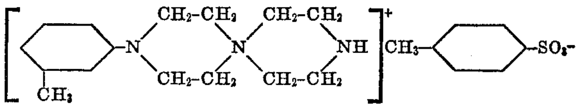

(9)

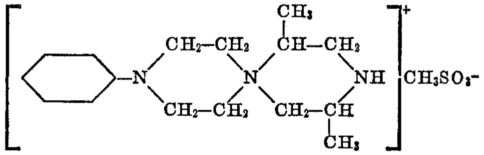

(10)

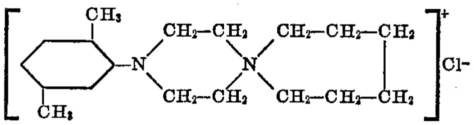

(11)

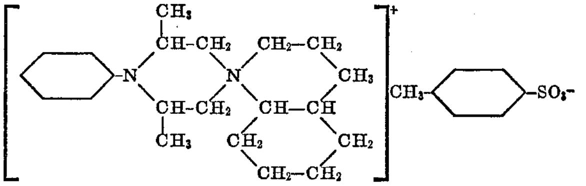

EXAMPLE 1

6.6 parts of 2-amino-5-nitrobenzonitrile are added at about 15° C. to a mixture of 44 parts by volume of N nitrosylsulphuric acid and 20 parts by volume of glacial acetic acid. After 2 hours, the diazotization mixture is poured onto 250 parts of ice and any excess of nitrous acid is destroyed by the addition of 2 parts of sulphamic acid. The diazo solution is then run into a solution of 16.1 parts of the coupling component of the formula

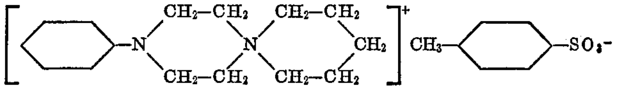

in 500 parts of water, 500 parts of ice and 20 parts of glacial acetic acid. The batch is stirred for 2 hours in an ice bath, the dyestuff that precipitates is isolated by vacuum filtration, dissolved again in 1,000 parts of water at 10° C. in the presence of 16 parts of crystallized sodium acetate. The dyestuff is then precipitated from the solution, which is neutral to Congo paper, by the addition of 50 parts of sodium chloride. It corresponds to the formula

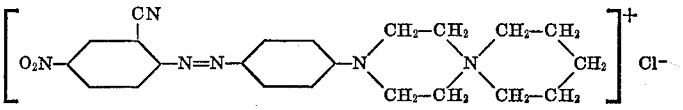

and dyes polyacrylonitrile fibers a brownish red shade possessing a high degree to light fastness.

Further cationic dyestuffs that are fast to light can be obtained in accordance with the procedure described in Example 1, when the components listed in Column I of the following table are diazotized and coupled with the components listed in Column II. They dye anionically modified polyacrylonitrile, polyester or polyamide fibres the shades listed in Column III.

| Line No. | I | II | III |
|---|---|---|---|
| 1 |  | 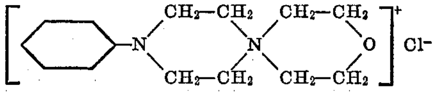 | Orange. |
| 2 | 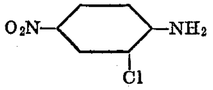 | 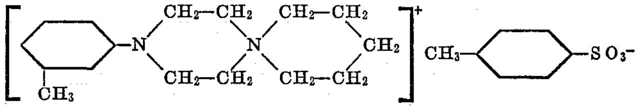 | Yellowish red. |
| 3 | 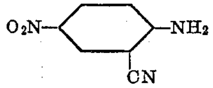 | 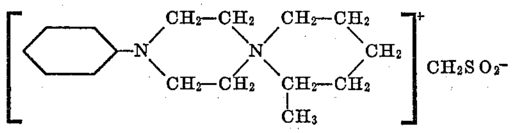 | Red. |
| 4 | 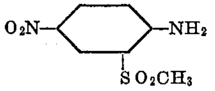 | Same as above | Red. |
| 5 | 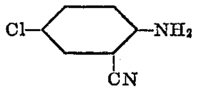 | 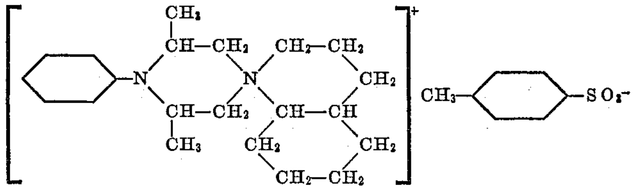 | Orange. |
| 6 | 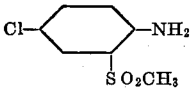 | Same as above | Do. |
| 7 | 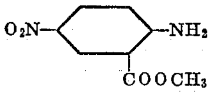 | 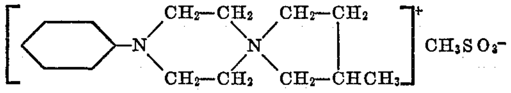 | Red. |
| 8 | 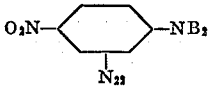 | 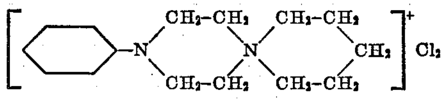 | Bluish red. |
| 9 | 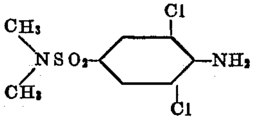 | Same as above | Yellow. |

TABLE—Continued
| Line No. | I | II | III |
|---|---|---|---|
| 10 | 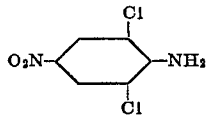 | 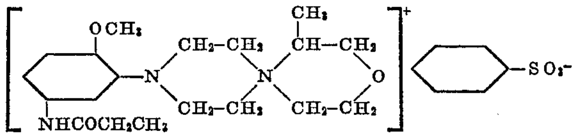 | Brown. |
| 11 | 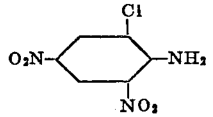 | 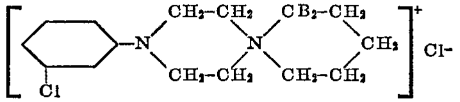 | Violet. |
| 12 | 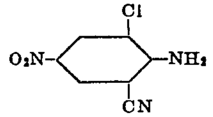 | 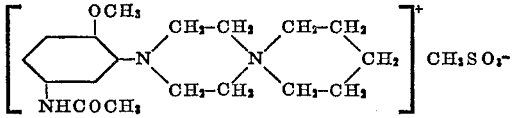 | Blue. |
| 13 | 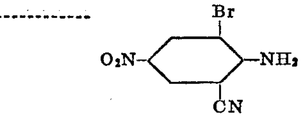 | 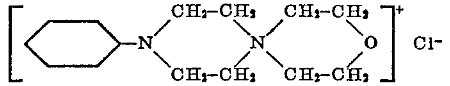 | Violet. |
| 14 | 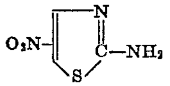 | Same as above | Do. |
| 15 | 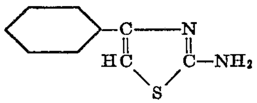 | 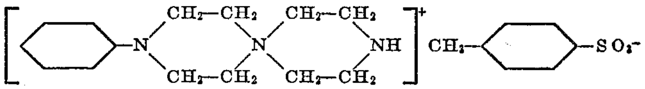 | Red. |
| 16 | 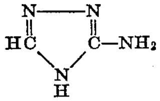 | 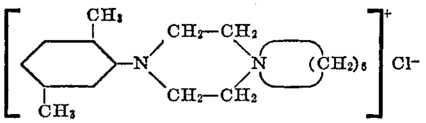 | Orange. |
| 17 | 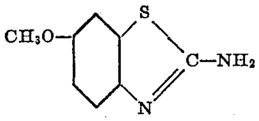 | 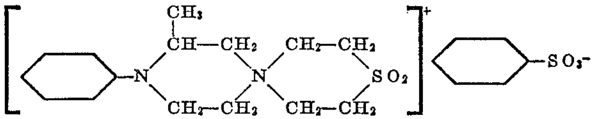 | Red. |
| 18 | 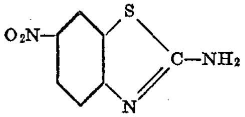 | Same as above | Violet. |

TABLE—Continued
| Line No. | I | II | III |
|---|---|---|---|
| 19 | 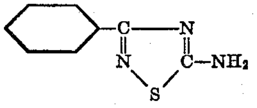 | 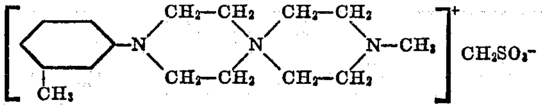 | Red. |
| 20 | 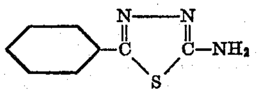 | 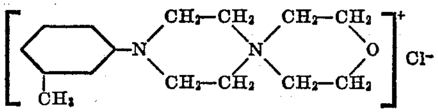 | Yellowish red. |
| 21 | 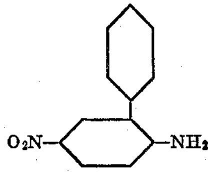 | 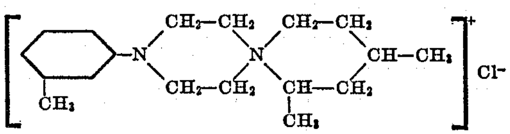 | Orange. |
| 22 | 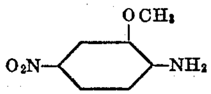 | 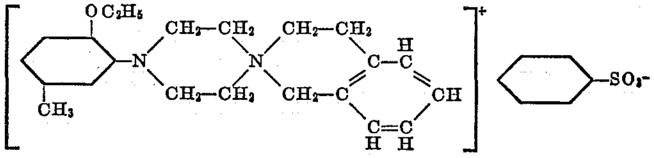 | Red. |
| 23 | 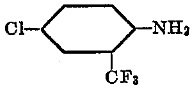 | 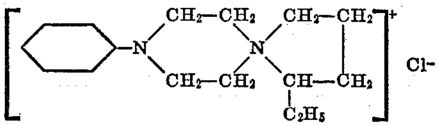 | Yellow. |
| 24 | 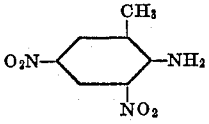 | 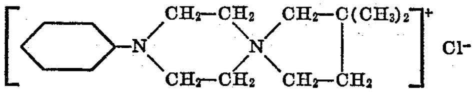 | Bluish red. |
| 25 | 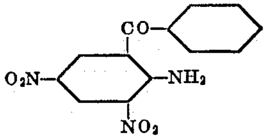 | 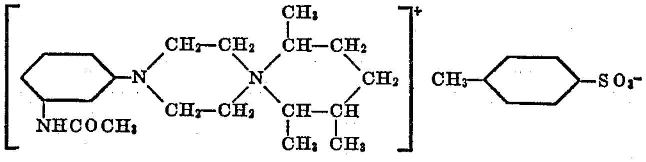 | Blue. |
| 26 | 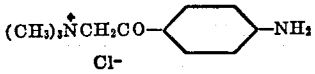 | 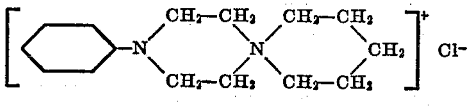 | Yellow. |

TABLE—Continued
| Line No. | I | II | III |
|---|---|---|---|
| 27 | 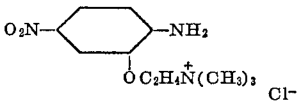 | 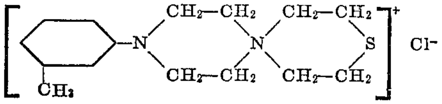 | Orange. |
| 28 | 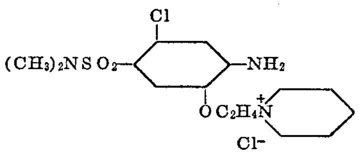 | 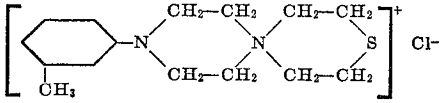 | Yellow. |
| 29 | 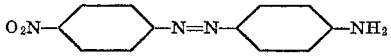 | 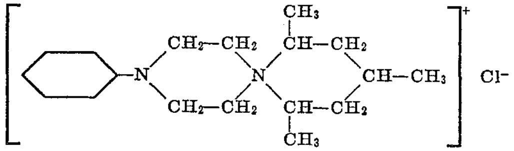 | Orange. |
| 30 | 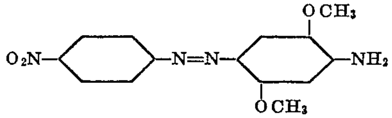 | 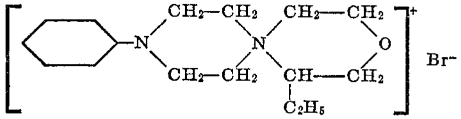 | Do. |
| 31 | 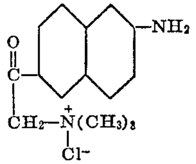 | 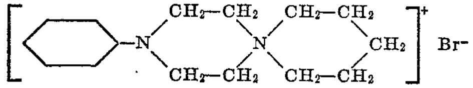 | Do. |
| 32 | 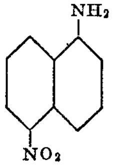 | Same as above | Brown. |
| 33 | 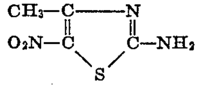 | 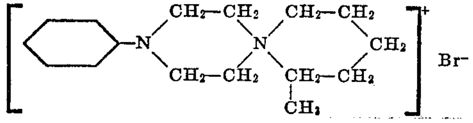 | Violet. |

TABLE—Continued
| Line No. | I | II | III |
|---|---|---|---|
| 34 | 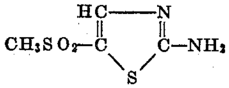 | 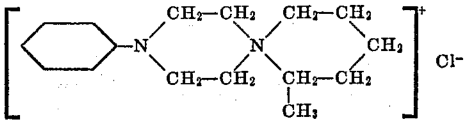 | Red. |
| 35 | 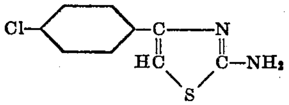 | 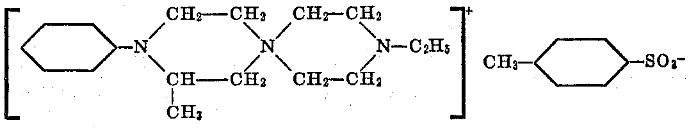 | Red. |
| 36 | 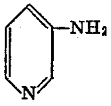 | 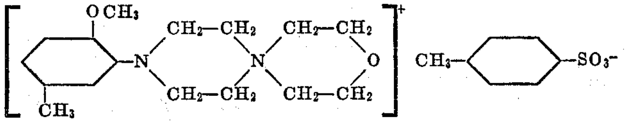 | Yellow. |
| 37 | 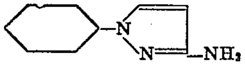 | Same as above | Do. |
| 38 | 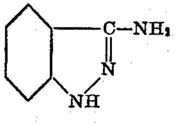 | 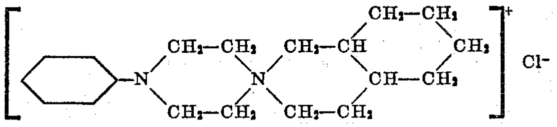 | Yellow-brown. |
| 39 | 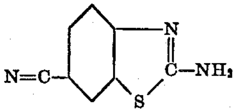 | 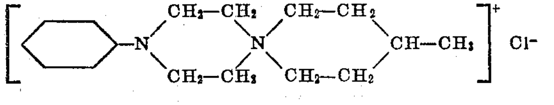 | Red. |
| 40 | 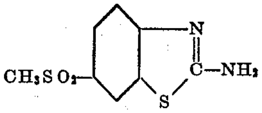 | Same as above | Red. |
| 41 | 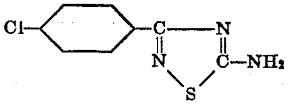 | 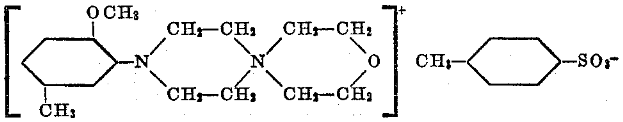 | Red. |
| 42 | 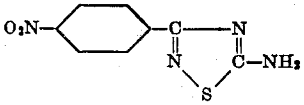 | 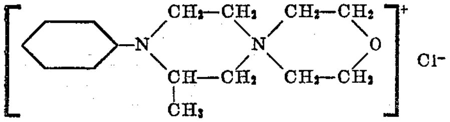 | Red. |

TABLE—Continued

| Line No. | I | II | III |
|---|---|---|---|
| 43 | 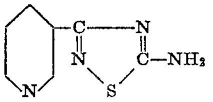 | 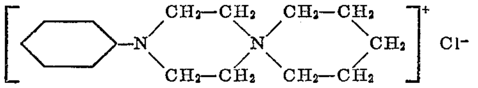 | Red. |
| 44 | 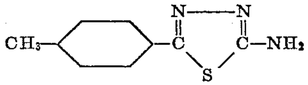 | Same as above | Yellowish red. |
| 45 | 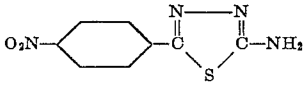 | 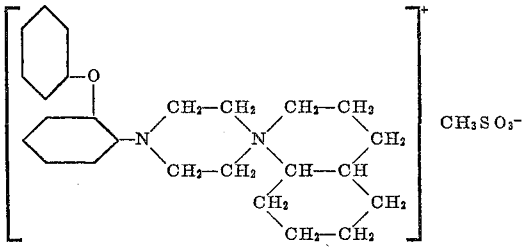 | Red. |
| 46 | 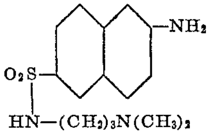 | 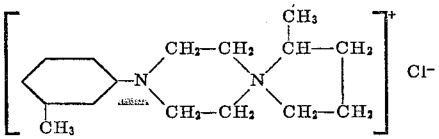 | Red. |

EXAMPLE 2

4.6 parts of the dyestuff of the formula

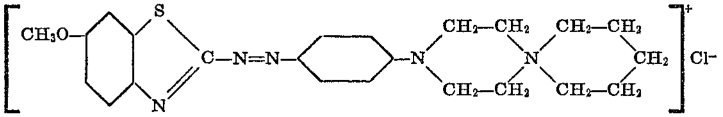

are dissolved in 50 parts of dimethylformamide at 80° C., and then 3.2 parts of dimethyl sulphate are added dropwise at that temperature. The batch is stirred at the specified temperature until starting material can no longer be detected in the reaction mixture by thin-layer chromatography. The dyestuff of the formula

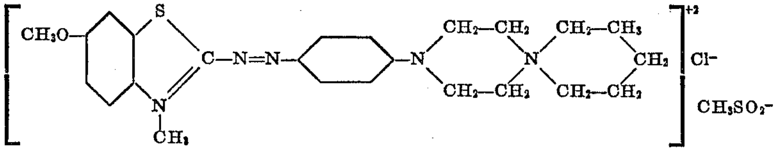

is isolated by dilution with 100 parts of ethyl acetate. It dyes polyacrylonitrile a fast blue shade when applied in the form of an aqueous solution.

The same dyestuff is obtained by treating equimolar amounts of 3-methyl-6-methoxybenzthiazolone-(2)-hydrazone and the compound of the formula

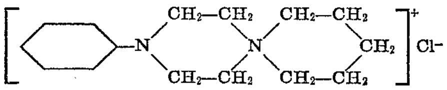

in dilute acetic acid solution with oxidizing agents for example iron (III) chloride or hydrogen peroxide.

Further two-fold positively charged cationic dyestuffs may be obtained by reacting the dyestuffs listed in Column I of the following table with the quaternating agents given in Column II. They dye polyacrylonitrile fabrics the shades indicated in Column III.

| | I | II | III |
|---|---|---|---|
| Number: | | | |
| 1 | Example 1, Table Line No. 15 | $(CH_3)_2SO_4$ | Reddish blue. |
| 2 | Example 1, Table Line No. 16 | $(CH_3)_2SO_4$ | Red. |
| 3 | Example 1, Table Line No. 17 | $H_5C_2I$ | Blue. |
| 4 | Example 1, Table Line No. 20 | $(CH_3)_2SO_4$ | Violet. |
| 5 | Example 1, Table Line No. 36 | 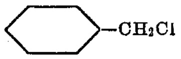 | Yellow. |
| 6 | Example 1, Table Line No. 43 | $(CH_3)_2SO_4$ | Bluish red. |
| 7 | Example 1, Table Line No. 44 | $(CH_3)_2SO_4$ | Violet. |
| 8 | Example 1, Table Line No. 46 | $(CH_3)_2SO_4$ | Red. |
| 9 | 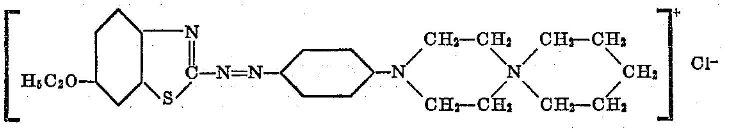 | $C_4H_9SO_3CH_3$ | Blue. |
| 10 | Same as above | 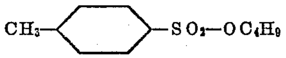 | Do. |
| 11 | do | 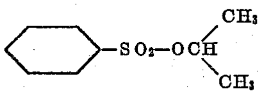 | Do. |
| 12 | do | $(C_2H_5O)_3{}^+BF_4{}^-$ | Do. |
| 13 | do | $CH_2=CH-CONH_2$ | Do. |
| 14 | 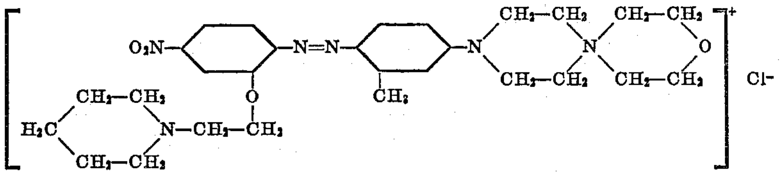 | $(CH_3)_2SO_4$ | Orange. |

EXAMPLE 3

67 parts of the disazo dyestuff of the formula

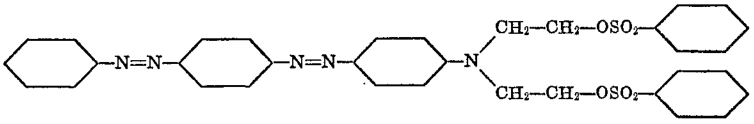

340 parts of anhydrous chlorobenzene and 21 parts of piperidine are refluxed for 4 hours. On cooling, the dyestuff of the formula

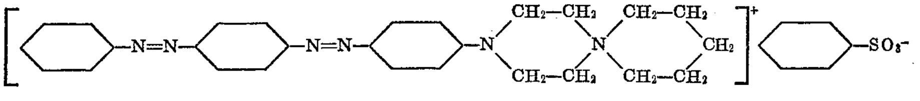

crystallizes out in admixture with piperidine-benzene sulphonate. The batch is filtered, the chlorobenzene is washed out with ethyl acetate, the residue is dissolved at 60° C. in 2,000 parts of water, and the dyestuff is precipitated in the form of a chloride by the addition of 100 parts of sodium chloride. It dyes polyacrylonitrile fibres a fast orange shade. Dyestuffs having similarly good properties may be obtained when the quaternating amidation is carried out with equivalent amount of morpholine, 2-methyl-5-ethylpiperidine, thiomorpholine or decahydroquinoline instead of piperidine.

What is claimed is:

1. Basic azo dyestuff of the formula

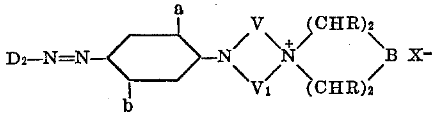

wherein $D_2$ is unsubstituted benzene or naphthalene or benzene or naphthalene substituted by chloro, bromo, nitro, cyano, trifluoromethyl, phenyl, phenylazo, 2-, 3- or 4-chlorophenylazo, 2,4-dichlorophenylazo, 2- or 3-nitrophenylazo, 4-methoxyphenylazo, sulphonamide or low-molecular N-alkylated sulphonamide, lower alkyl, lower alkoxy, lower alkylsulphonyl, lower carbalkoxy, carboxy-$\beta$-methoxyethylester, $\alpha$-N-chlorotrimethylaminoacetyl, $\beta$-N-chloro - trimethylaminoethoxy, $\beta$-N-chloro-pyridylethoxy or acyl, the term "lower" denoting not more than 4 carbon atoms and the term "acyl" denotes aryl or alkyl carboxylic acid containing not more than 7 carbon atoms and pyridyl, thiazolyl, nitrothiazolyl, methylsulphonylthiazolyl, cyanothiazolyl, methyl-nitrothiazolyl, methylthiazolyl, phenylthiazolyl, (4'-chloro)-phenylthiazolyl, (4'-nitro)-phenylthiazolyl, quinolinyl, pyrazolyl, phenylpyrazolyl, indazolyl, 1,2,4-triazolyl, (4'-methoxyphenyl)-pyrazolyl, benzthiazolyl, methylbenzthiazolyl, methoxybenzthiazolyl, ethoxybenzthiazolyl, chlorobenzthiazolyl, cyanobenzthiazolyl, nitrobenzthiazolyl, carboethoxythiazolyl, nitrobenzthiazolyl, carboethoxybenzthiazolyl, methylsulphonylbenzthiazolyl, 1,3,4-thiadiazolyl, 1,3,5-thiadiazolyl, phenyl-(p-chlorophenyl)-, (p-nitrophenyl)-pyridyl- or methyl-1,3,4 - thiadiazolyl and (p-methylphenyl), (p-nitrophenyl) or phenyl-1,3,4-thiadiazolyl; V and $V_1$ each represents ethylene, propylene or isopropylene; B represents —CHR—, —NR—, —O—, —S—, a direct bond, —$SO_2$— or —$CH_2CH_2$—; R represents hydrogen, methyl or ethyl or one of said R forms a fused carbocyclic ring of 4 carbon atoms; *a* represents hydrogen, phenoxy, alkyl or alkoxy each containing not more than 4 carbon atoms, *b* represents hydrogen or chloro, trifluoromethyl, alkoxy, alkyl each containing up to 4 carbon atoms, phenyl or alkanoylamine containing up to 4 carbon atoms; and $X^-$ represents an anion.

2. A compound according to claim 1, wherein $X^-$ is chloride, bromide, iodide, methyl sulfate, ethyl sulfate, low-molecular alkane sulfonate containing 1 to 4 carbon atoms, benzenesulfonate, 2- or 4-methylbenzenesulfonate, 4-chlorobenzenesulfonate, 3- or 4-nitrobenzenesulfonate, or the anion of sulfuric, phosphoric, formic, lactic, tartaric or trichlorozincic acid.

3. Basic azo dyestuff as claimed in claim 1 of the formula

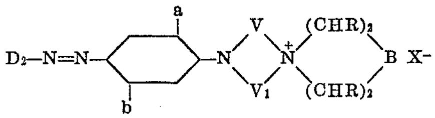

wherein $D_2$ represents a diazo component selected from the group consisting of

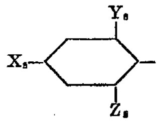

in which $Y_s$ represents hydrogen, nitro, chloro, bromo, cyano, trifluoromethyl or low-molecular alkyl, low-molecular alkoxy or low-molecular carbalkoxy; $X_s$ is hydrogen, chloro, bromo, nitro, cyano, phenylazo, sulphonic acid amide or low-molecular carbalkoxy, low-molecular alkanesulfonyl or low-molecular N-alkyl sulfonic acid amide and $Z_s$ is hydrogen, chloro, bromo, benzoyl or alkylcarbonyl containing at most 7 carbon atoms and in which at least one of the symbols $X_s$ and $Y_s$ represents chloro, bromo, nitro, cyano, sulphonic acid amide, phenylazo, 2-, 3- or 4-chlorophenylazo, 2,4-dichlorophenylazo, 2- or 3-nitrophenylazo, 4-methoxyphenylazo or low-molecular carbalkoxy, low-molecular alkylsulphonyl or low-molecular N-alkyl sulphonic acid amide and low-molecular means containing at most 4 carbon atoms.

4. Basic azo dyestuff of the formula

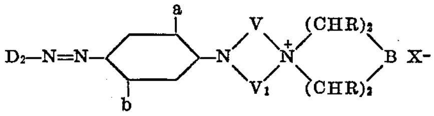

wherein $D_2$ represents a diazo component selected from the group consisting of

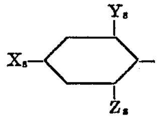

in which $Y_s$ represents hydrogen, methyl, nitro, chloro, bromo, cyano, trifluoromethyl, carbomethoxy, methylsulfonyl, phenoxy, methoxy, benzoyl or methylphenylazo; $X_s$ is hydrogen, chlorine, bromine, methyl, nitro, cyano, methylsulfonyl, carboethoxy, phenoxy, phenylsulfonic acid, dimethylamide, sulfonic acid amide, N-methyl sulfonic acid amide, 2-chlorophenylazo, 2,4-dichlorophenylazo, 2-nitrophenylazo, 4-methoxyphenylazo, carboxy-$\beta$-methoxy ethyl ester of $$(CH_3)_3-\overset{+}{N}-CH_2-CO-$$
$$Cl^-$$

and $Z_5$ is hydrogen, chloro, bromo, nitro, benzoyl, cyano, cyclohexyl, ethoxy or

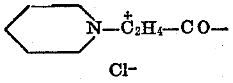

5. The basic azo dyestuff of the formula

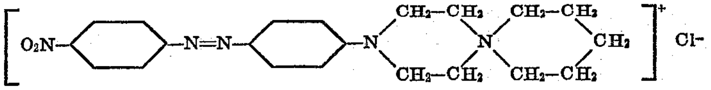

6. The basic azo dyestuff of the formula

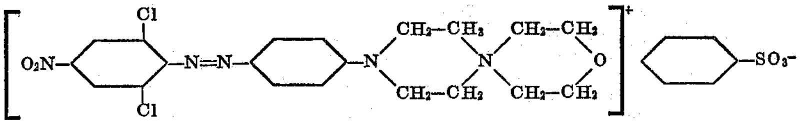

7. The basic azo dyestuff of the formula

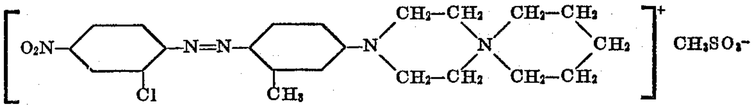

8. The basic azo dyestuff of the formula

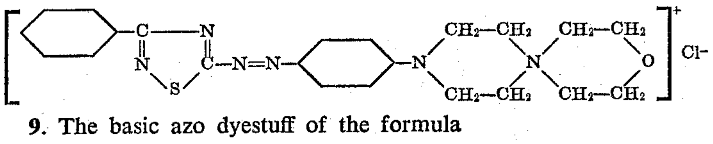

9. The basic azo dyestuff of the formula

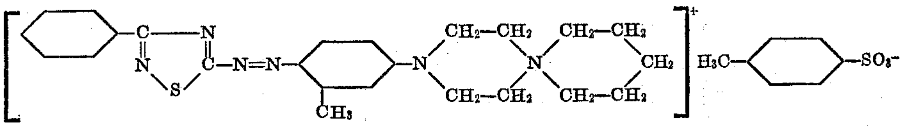

10. The basic azo dyestuff of the formula

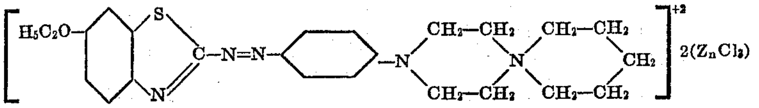

References Cited

UNITED STATES PATENTS

| | | | |
|---|---|---|---|
| 2,632,703 | 3/1953 | Slifkin | 260—154 X |
| 3,086,003 | 4/1963 | Baumann et al. | 260—154 X |

FLOYD D. NIGEL, Primary Examiner

U.S. Cl. X.R.

206—253, 266; 260—152, 154, 243 B, 247, 247.7 R, 247.7 A, 247.7 D, 268 TR, 268 PC, 456 A

PO-1050
(5/69)

UNITED STATES PATENT OFFICE
CERTIFICATE OF CORRECTION

Patent No. 3,711,459 Dated January 16, 1973

Inventor(s) GERT HEGAR

It is certified that error appears in the above-identified patent and that said Letters Patent are hereby corrected as shown below:

Column 25, line 72, delete "alkanoylamine" and insert

-- alkanoylamino --;

Column 27, claim 6, right-hand portion of formula within brackets should read

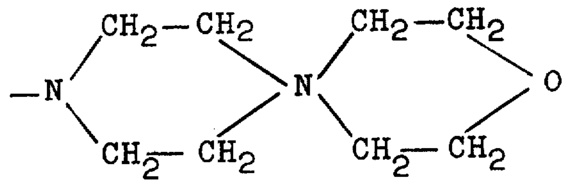

Signed and sealed this 18th day of June 1974.

(SEAL)
Attest:

EDWARD M.FLETCHER,JR.
Attesting Officer

C. MARSHALL DANN
Commissioner of Patents df